United States Patent [19]
Yamamoto et al.

[11] Patent Number: 5,334,679
[45] Date of Patent: Aug. 2, 1994

[54] METHOD FOR PRODUCTION OF WATER-SOLUBLE CATIONIC POLYMER

[75] Inventors: Takushi Yamamoto; Hiroari Hara; Nobuhiro Maeda; Morio Nakamura, all of Himeji, Japan

[73] Assignee: Sumitomo Seika Chemicals Co., Ltd., Hyogo, Japan

[21] Appl. No.: 95,830

[22] Filed: Jul. 22, 1993

Related U.S. Application Data

[63] Continuation of Ser. No. 891,818, Jun. 1, 1992, abandoned.

[30] Foreign Application Priority Data

Jun. 1, 1991 [JP] Japan .................. 3-157824

[51] Int. Cl.$^5$ .................. C08F 2/18; C08F 2/32
[52] U.S. Cl. .................. 526/200; 526/207; 526/209; 526/312
[58] Field of Search .................. 526/200, 209, 207

[56] References Cited

U.S. PATENT DOCUMENTS

| | | |
|---|---|---|
| 4,158,726 | 6/1979 | Kamada .................. 526/200 |
| 4,563,497 | 1/1986 | Masanek . | |
| 4,973,632 | 11/1990 | Nagasuna . | |
| 5,026,800 | 6/1991 | Kimura .................. 526/200 |

FOREIGN PATENT DOCUMENTS

| | | |
|---|---|---|
| 50-39379 | 4/1975 | Japan . |
| 54-69196 | 6/1979 | Japan . |
| 54-102338 | 8/1979 | Japan . |
| 55-66911 | 5/1980 | Japan . |

*Primary Examiner*—Christopher Henderson
*Attorney, Agent, or Firm*—Birch, Stewart, Kolasch & Birch

[57] ABSTRACT

The present invention is directed to a method for production of a water-soluble cationic polymer comprising polymerizing a cationic vinyl monomer; either a cationic acrylate monomer alone or a mixture of said monomer and another monomer copolymerizable therewith, in dispersion medium in the presence of a surfactant by suspension polymerization method. The present invention offers an industrially advantageous method to obtain the water-soluble cationic polymer with a high degree of cationization and a high viscosity in water solution which can be used for flocculants, antistatic agents, retention aids for paper manufacturing and other purposes.

8 Claims, No Drawings

METHOD FOR PRODUCTION OF WATER-SOLUBLE CATIONIC POLYMER

This application is a continuation of application Ser. No. 07/891,818 filed on Jun. 1, 1992, now abandoned.

FIELD OF THE INVENTION

The present invention relates to a method for production of a water-soluble cationic polymer used for flocculants, antistatic agents, retention aids for paper manufacturing and other purposes.

BACKGROUND OF THE INVENTION

Traditionally, various methods have been proposed to produce a water-soluble cationic polymer used for flocculants, antistatic agents, retention aids for paper manufacturing and other purposes, including polymerization in aqueous solution (e.g., Japanese Patent Laid-Open No. 39379/1975), water-in-oil emulsion polymerization (e.g., Japanese Patent Laid-Open No. 102388/1979) and suspension polymerization in hydrophobic solvent (e.g., Japanese Patent Laid-Open Nos. 69196/1979 and 66911/1980).

At present, homopolymers of cationic methacrylate monomer or cationic acrylate monomer, or copolymers of said monomer and another monomer copolymerizable with said monomer (e.g., acrylamide) are produced by polymerization in aqueous solution. Generally, many of them contain a high ratio of cationic methacrylate monomer. This is because those containing a high ratio (not less than 60%) of cationic acrylate monomer are very difficult to produce. In other words, this is due to the fact that cationic acrylate monomer is more sensitive to hydrolysis than cationic methacrylate monomer, and the hygroscopicity of cationic acrylate polymer is higher than that of cationic methacrylate polymer. Thus, when producing a polymer mainly based on cationic acrylate monomer, it is necessary to maximize the concentration of said monomer to suppress the hydrolysis of said monomer, but when the monomer concentration is increased, polymerization temperature becomes difficult to control so that it becomes too high, which results in hydrolysis. It is not desirable to conduct polymerization at the cost of hydrolysis of cationic acrylate monomer, because the expensive cationic monomer is wasted. Other problems have also been pointed out. For example, the polymer obtained adheres to the inside wall of drier during drying because it is highly hygroscopic, which in turn lowers the drying efficiency. In addition, the polymer is difficult to pulverize because once-pulverized particles mutually adhere again when pulverizing. This tendency becomes more marked as the ratio of cationic acrylate monomer increases.

Water-in-oil emulsion polymerization has the disadvantage that the use of the product which is in an emulsion form is very dangerous because the product contains a large amount of ignitable organic solvent, and further the precious organic solvent is wasted.

In suspension polymerization, the use of a sorbitan fatty acid ester, such as sorbitan monooleate or ethyl cellulose, as a surfactant is known. However, when sorbitan monooleate is used for suspension polymerization, the particle size of the obtained polymer is very fine, at 10 to 100 μm in diameter. Therefore, it is necessary to take a countermeasure against dust formation in handling the powder, and the poor fluidity makes its handling very difficult. In addition, it is very difficult to dissolve in water because formation of powder lump is likely to occur due to the smallness of the particle size.

When ethyl cellulose is used for suspension polymerization, the amount of ethyl cellulose used increases because of the inferior polymerization stability, which results in an increase in insoluble substances when the polymer is dissolved in water. Also, adhesion to the drier is remarkable, which results in entire or partial aggregation of the product. This method is therefore undesirable.

As stated above, various methods have been proposed to produce a water-soluble cationic polymer, but all have various drawbacks as described above. Thus, there has been demand for a new method free of these problems by which a polymer with a high degree of cationization and a high viscosity when dissolved in water is industrially advantageously produced, but there has been found no useful method.

SUMMARY OF THE INVENTION

It is an object of the present invention to provide a method for producing a water-soluble cationic polymer with a high degree of cationization and a high viscosity in water solution which is industrially advantageous.

With the aim of solving the problems described above, the present inventors made investigations and developed the present invention. Accordingly, the present invention essentially relates to a method for production of a water-soluble cationic polymer comprising polymerizing a cationic vinyl monomer, which is either a cationic acrylate monomer represented by the Formula (1) alone or a mixture of said monomer and another monomer copolymerizable therewith, in a dispersion medium, in the presence of a surfactant, by the suspension polymerization method, wherein the surfactant is a sucrose fatty acid ester whose HLB is 2 to 12 and/or a polyglycerol fatty acid ester whose HLB is 2 to 16.

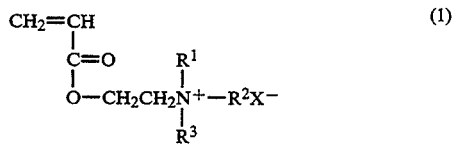

(1)

In the Formula (1), $R^1$ and $R^2$ represent an alkyl group having 1 to 4 carbon atoms, $R^3$ represents a hydrogen atom or alkyl group having 1 to 4 carbon atoms, and $X^-$ represents a halide ion, sulfate ion, nitrate ion, phosphate ion, carboxylate ion or sulfonate ion.

DETAILED DESCRIPTION OF THE INVENTION

The cationic vinyl monomer used for the present invention is either a cationic acrylate monomer represented by the Formula (1) alone or a mixture of said monomer and another monomer copolymerizable therewith. With respect to the Formula (1), an alkyl group having 1 to 4 carbon atoms represented by $R^1$, $R^2$ or $R^3$ is not subject to limitation, whether linear or branched. Examples of such alkyl groups include methyl group, ethyl group, n-propyl group, isopropyl group, n-butyl group and isobutyl group, with preference given to methyl group and ethyl group. $X^-$ represents a halide ion, sulfate ion, nitrate ion, phosphate ion, carboxylate ion or sulfonate ion.

Examples of such cationic acrylate monomers include 2-acryloyloxyethyltrimethylammonium chloride, 2-acryloyloxyethyltriethylammonium chloride, 2-acryloyloxyethyltrimethylammonium methyl sulfate, 2-acryloyloxyethyldimethylethylammonium bromide and 2-acryloyloxyethyldimethylethylammonium monoethyl sulfate, with preference given to 2-acryloyloxyethyltrimethylammonium chloride.

Examples of the monomer copolymerizable with cationic acrylate monomer for the present invention include acrylamide, methacrylamide, acrylic acid, 2-hydroxyethyl methacrylate and N,N-dimethylacrylamide, with preference given to acrylamide and methacrylamide.

The concentration of the aqueous solution of monomer used for polymerization may be 25 to 80% by weight, but when obtaining a water-soluble cationic polymer with a high degree of cationization and a high degree of polymerization, the concentration of the aqueous solution of monomer is preferably 40 to 80% by weight. If the concentration of the aqueous solution of monomer is lower than 25% by weight, the cationic monomer will be liable to undergo hydrolysis and the volume efficiency decreases, which is, therefore, economically undesirable. If the concentration of the aqueous solution of monomer exceeds 80% by weight, a water-insoluble polymer will be produced, which is undesirable.

As for the ratio of the cationic acrylate monomer described above and another monomer copolymerizable therewith as monomer components, the percentage of the cationic acrylate monomer usually accounts for 60 to 100 mol %. If the amount of the cationic acrylate monomer is lower than 60 mol %, an activity as the cationic polymer decreases, which is undesirable.

The surfactant used for the present invention is exemplified by a sucrose fatty acid ester whose HLB is 2 to 12 and/or a polyglycerol fatty acid ester whose HLB is 2 to 16. Here, the sucrose fatty acid ester comprises one or more fatty acids selected from the group consisting of stearic acid, palmitic acid, lauric acid and oleic acid, and one or more esters selected from the group consisting of mono-, di- and tri-esters per unit of sucrose. Examples of such sucrose fatty acid esters include sucrose tristearate, sucrose di-tristearate, sucrose di-stearate and sucrose mono-distearate, which may be used singly or in combination. When HLB is in the range from 2 to 6, a beady polymer of 100 to 500 μm in diameter is obtained, and when HLB is in the range from 6 to 12, a granular polymer of 100 to 500 μm in diameter is obtained. When using a sucrose fatty acid ester whose HLB is under 2, the polymer obtained may be an aggregate, though a stable emulsion can be formed. When using a sucrose fatty acid ester whose HLB is more than 12, a stable emulsion cannot be formed, which is undesirable.

The polyglycerol fatty acid ester used for the present invention is a compound represented by the Formula (2), wherein the fatty acid comprises one or more kinds selected from the group consisting of lauric acid, palmitic acid, stearic acid, oleic acid and behenic acid.

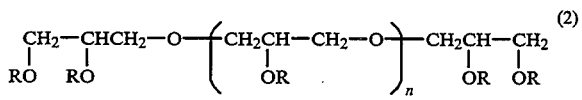
(2)

In the Formula (2), R represents an acyl group or hydrogen atom, which may be identical or different, and n represents an integer of 0 to 8.

Examples of such polyglycerol fatty acid esters include diglyceryl monobehenylate, diglyceryl monostearate, diglyceryl monolaurate, hexaglyceryl dipalmitate, hexaglyceryl monostearate, hexaglyceryl dioleate, hexaglyceryl monobehenylate, decaglyceryl pentastearate and decaglyceryl heptastearate. When HLB is in the range of from 2 to 16, a granular polymer of 100 to 600 μm in diameter is obtained. When using a polyglycerol fatty acid ester whose HLB is under 2, the polymer obtained is an aggregate, though a stable emulsion can be formed. When using a polyglycerol fatty acid ester whose HLB exceeds 16, it does not serve well as a surfactant because it is sparingly soluble in petroleum hydrocarbon solvents.

Also, good results may be obtained when the sucrose fatty acid ester and polyglycerol fatty acid ester described above are used as a mixture to obtain the desired levels of particle size, aqueous solution viscosity and other properties according to the use of the water-soluble cationic polymer. The amount of these surfactants used is appropriately in the range from 0.05 to 5% by weight, preferably 0.1 to 2% by weight of the monomer. If the amount is less than 0.05% by weight, a stable emulsion condition cannot be maintained, and if it is more than 5% by weight, corresponding good results cannot be obtained, which is not economical.

Any dispersion medium in common use for suspension polymerization can be used for the present invention without limitation. Examples of dispersion media which can be preferably used include aliphatic hydrocarbon solvents such as hexane and heptane, and alicyclic hydrocarbon solvents such as cyclohexane and cycloheptane, and further aromatic hydrocarbon solvents such as benzene and toluene can also be used.

Examples of polymerization initiators used for the present invention include azo compounds such as azobis(2-amidinopropane) dihydrochloride and 4,4'-azobis-4-cyanovaleric acid, peroxides such as potassium persulfate and ammonium persulfate, and redox polymerization initiators comprising a combination of these peroxides and reducing agents. The amount of these polymerization initiators used is normally 0.005 to 0.5% by weight of the monomer. If the amount of polymerization initiator used is less than 0.005% by weight, good polymerization cannot be achieved, and if it is more than 0.5% by weight, it is impossible to obtain a water-soluble polymer with a high molecular weight and a high viscosity in water solution.

In the method of the present invention, the monomer described above is polymerized by suspension polymerization in a dispersion medium using a surfactant, and the suspension polymerization itself is carried out in accordance with a known method. After completion of polymerization, the desired polymer can easily be obtained by a known method. For example, water is removed by azeotropic refluxing after completion of polymerization, and then the solvent is distilled off to yield a beady or granular cationic polymer.

The water-soluble cationic polymer according to the present invention thus obtained is a homopolymer of the cationic acrylate monomer or a copolymer of said monomer and another monomer copolymerizable therewith. Its molecular weight can be calculated from the commonly known equation for the relationship between limiting viscosity [η] and molecular weight. The polymer of the present invention is a polymer with a high molecular weight whose limiting viscosity is 5 to 15 of [η] according to the method as described below. Also, the degree of cationization of the water-soluble cationic polymer obtained by the present invention is 3.0 to 5.2, indicating a high degree of cationization, as determined by the method as described below.

The present invention makes it possible to obtain an excellent water-soluble cationic polymer used for flocculants, antistatic agents, retention aids for paper manufacturing and other purposes. Since it allows easy obtainment of a polymer with a high degree of cationization and a high viscosity in water solution, it offers a cationic polymer best suited for flocculants.

Also, it has become unnecessary to take countermeasures against powder dust because the particle size of the polymer produced has increased; the storage stability has increased because the degree of mutual adhesion of particles has decreased; it has become possible to improve the workability because the fluidity has increased; and it has become possible to improve the workability because the solubility is improved. Also, because there is no polymer adhesion in the reactor and drier, stable operation has become possible, so that it has become possible to stably supply the product economically.

As stated above, the method of the present invention is industrially advantageous in that a polymer with a high degree of cationization and a high viscosity in water solution can easily be produced, thereby solving the various conventional problems.

EXAMPLES

The present invention is hereinafter described in more detail by means of the following examples, but the invention is not limited by them. The physical properties of the polymer obtained were determined as follows.

Determination of limiting viscosity 0.2 g of the polymer was dissolved in 200 ml of an aqueous solution of 1N NaCl to prepare a 0.1% solution, which was further diluted with an aqueous solution of 1N NaCl to prepare 0.075% and 0.05% solutions. These solutions were subjected to viscometry using Ostwald's viscometer at 30° C. From the specific viscosity obtained, limiting viscosity [η] was calculated by extrapolation.

Determination of the degree of cationization 0.2 g of the polymer was dissolved in 100 ml of ion exchange water to prepare a 0.2% aqueous solution, which was further diluted to prepare a 500 ppm aqueous solution. A 10 ml portion of this solution was transferred to a 200 ml beaker, and 90 ml of ion exchange water was added. After this solution was adjusted to a pH of 4 with dilute hydrochloric acid, a solution of Toluidine Blue indicator was added, and titration was conducted with an aqueous solution of N/400 potassium polyvinylsulfate to determine the degree of cationization (meq/g).

Example 1

To a 1-liter four-necked separable flask equipped with a condenser, a nitrogen sparger, a dripping funnel and a stirring impeller blade, 565 ml of normal heptane and 1.48 g of sucrose di-tristearate having an HLB value of 3 as a surfactant were added. Separately, a solution of 89.6 g of 2-acryloyloxyethyltrimethylammonium chloride (75% aqueous solution) and 16.5 g of acrylamide in 103 g of ion exchange water as an aqueous solution of monomer (whole monomer concentration 40%) and 0.88 g of a 10% aqueous solution of azobis(2-amidinopropane) dihydrochloride as a polymerization initiator were introduced into the dropping funnel. After the surfactant was completely dissolved, the aqueous solution of monomer in the dripping funnel was dropped into the flask and dispersed at 30° to 50° C. in a nitrogen stream, after which it was heated to 70° to 80° C. and maintained at this temperature for 1 hour to complete polymerization. After completion of polymerization, water was removed by azeotropic refluxing, and then the solvent was distilled off to yield 88.4 g of a beady cationic polymer of 150 to 350 μm in diameter. This polymer had a limiting viscosity of 8.4 and a degree of cationization of 4.0. There was no adhesion to the flask. The water solubility of the polymer obtained was good.

Example 2

The polymerization was carried out in the same manner as in Example 1 except that a solution of 119.7 g of 2-acryloyloxyethyltrimethylammonium chloride (75% aqueous solution) and 8.2 g of acrylamide in 116.6 g of ion exchange water as an aqueous solution of monomer (whole monomer concentration 40%) and 0.22 g of a 10% aqueous solution of azobis(2-amidinopropane) dihydrochloride as a polymerization initiator were used to yield 103.9 g of a beady cationic polymer of 150 to 350 μm in diameter. This polymer had a limiting viscosity of 8.0 and a degree of cationization of 4.4. There was no adhesion to the flask. The water solubility of the polymer was good.

Example 3

The polymerization was carried out in the same manner as in Example 1 except that a solution of 134.7 g of 2-acryloyloxyethyltrimethylammonium chloride (75% aqueous solution) and 4.1 g of acrylamide in 26.3 g of ion exchange water as an aqueous solution of monomer (whole monomer concentration 64%) and 0.22 g of a 10% aqueous solution of azobis(2-amidinopropane) dihydrochloride as a polymerization initiator were used to yield 111.4 g of a beady cationic polymer of 150 to 350 μm in diameter. This polymer had a limiting viscosity of 12.2 and a degree of cationization of 4.8. There was no adhesion to the flask. The water solubility of the polymer was good.

Example 4

The polymerization was carried out in the same manner as in Example 1 except that a solution of 149.6 g of 2-acryloyloxyethyltrimethylammonium chloride (75% aqueous solution) diluted with 37.4 g of ion exchange water as an aqueous solution of monomer (monomer concentration 60%) and 0.22 g of a 10% aqueous solution of azobis(2-amidinopropane) dihydrochloride as a polymerization initiator were used to yield 118.9 g of a beady cationic polymer of 150 to 350 μm in diameter. This polymer had a limiting viscosity of 8.8 and a degree of cationization of 4.8. There was no adhesion to the flask. The water solubility of the polymer was good.

Example 5

The polymerization was carried out in the same manner as in Example 1 except that 0.22 g of sucrose di-tristearate having an HLB value of 3 as a surfactant, 149.6 g of 2-acryloyloxyethyltrimethylammonium chloride (75% aqueous solution) as an aqueous solution of monomer (monomer concentration 75%) and 0.22 g of a 10% aqueous solution of azobis(2-amidinopropane) dihydrochloride as a polymerization initiator were used to yield 120.0 g of a beady cationic polymer of 150 to 350 μm in diameter. This polymer had a limiting viscosity of 12.6 and a degree of cationization of 4.9. There was no adhesion to the flask. The water solubility of the polymer was good.

Example 6

The polymerization was carried out in the same manner as in Example 1 except that a solution of 149.6 g of 2-acryloyloxyethyltrimethylammonium chloride (75% aqueous solution) diluted with 74.8 g of ion exchange water as an aqueous solution of monomer (monomer concentration 50%) and 0.22 g of a 10% aqueous solution of azobis(2-amidinopropane) dihydrochloride as a polymerization initiator were used to yield 121.2 g of a beady cationic polymer of 150 to 350 μm in diameter. This polymer had a limiting viscosity of 7.0 and a degree of cationization of 5.0. There was no adhesion to the flask. The water solubility of the polymer was good.

Example 7

The polymerization was carried out in the same manner as in Example 1 except that 1.48 g of sucrose di-stearate having an HLB value of 5 as a surfactant was used to yield 88.0 g of a beady cationic polymer of 150 to 350 μm in diameter. This polymer had a limiting viscosity of 7.8 and a degree of cationization of 4.0. There was no adhesion to the flask. The water solubility of the polymer was good.

Example 8

The polymerization was carried out in the same manner as in Example 1 except that 1.48 g of sucrose mono-distearate having an HLB value of 9 as a surfactant was used to yield 88.5 g of a granular cationic polymer of 150 to 350 μm in diameter. This polymer had a limiting viscosity of 8.1 and a degree of cationization of 4.0. There was no adhesion to the flask. The water solubility of the polymer was good.

Example 9

The polymerization was carried out in the same manner as in Example 1 except that 1.48 g of decaglyceryl pentastearate having an HLB value of 3.5 (Commercial name: Decaglyn 5-S, produced by Nippon Chemical Co., Ltd.) as a surfactant was used to yield 88.7 g of a beady cationic polymer of 200 to 600 μm in diameter. This polymer had a limiting viscosity of 8.0 and a degree of cationization of 3.9. There was no adhesion to the flask. The water solubility of the polymer was good.

Example 10

The polymerization was carried out in the same manner as in Example 1 except that 0.74 g of diglyceryl mono-behenylate having an HLB value of 7.8 (Commercial name: Nonion GV-102, produced by Nippon Oil and Fats Co., Ltd.) as a surfactant was used to yield 87.5 g of a beady cationic polymer of 200 to 600 μm in diameter. This polymer had a limiting viscosity of 7.9 and a degree of cationization of 4.0. There was no adhesion to the flask. The water solubility of the polymer was good.

Example 11

The polymerization was carried out in the same manner as in Example 1 except that 0.06 g of hexaglyceryl mono-behenylate having an HLB value of 13.1 (Commercial name: Nonion GV-106, produced by Nippon Oil and Fats Co., Ltd.) as a surfactant, 149.6 g of 2-acryloyloxyethyltrimethylammonium chloride (75% aqueous solution) as an aqueous solution of monomer (monomer concentration 75%) and a 10% aqueous solution of azobis(2-amidinopropane) dihydrochloride as a polymerization initiator were used to yield 119.5 g of a cationic polymer of 150 to 350 μm in diameter. This polymer had a limiting viscosity of 11.8 and a degree of cationization of 5.0. There was no adhesion to the flask. The water solubility of the polymer was good.

Example 12

The polymerization was carried out in the same manner as in Example 1 except that 565 ml of cyclohexane was used in the place of normal heptane as a dispersion medium to yield 88.4 g of a cationic polymer of 150 to 350 μm in diameter. This polymer had a limiting viscosity of 8.2 and a degree of cationization of 4.0. There was no adhesion to the flask. The water solubility of the polymer was good.

Comparative Example 1 (polymerization in aqueous solution)

To 224.4 g of 2-acryloyloxyethyltrimethylammonium chloride (75% aqueous solution), 112.2 g of ion exchange water was added to prepare a 50% aqueous solution of monomer. While keeping this solution at 20° C., 0.33 g of a 10% aqueous solution of azobis(2-amidinopropane) dihydrochloride was added and mixed, and thereafter this mixture was immediately transferred to a Teflon-lined stainless steel container. After replacing the gas phase in the system with nitrogen gas, the container was kept standing in a water bath at 50° C. After 15 minutes of induction time, polymerization occurred, followed by a rapid heat generation; 7 minutes later, the temperature of the center part of the container reached a maximum of 107° C. and the polymerization completed itself. The product was a gel-like polymer having rubber elasticity and tackiness. This gel-like polymer was then extruded to a string of 5 mm in diameter using an extruder, which was dried with 100° C. hot air for 1 hour and then pulverized using a mixer. However, this polymer was so highly hygroscopic that the pulverized particles became re-adhered to form aggregates. The yield of the polymer obtained was 183.4 g. This polymer had a limiting viscosity of 3.0, and the molecular weight was low. Its degree of cationization was 3.9, indicating a high degree of hydrolysis. The water solubility of the polymer was poor.

Comparative Example 2 (polymerization in low monomer concentration)

The polymerization was carried out in the same manner as in Example 1 except that a solution of 89.6 g of 2-acryloyloxyethyltrimethylammonium chloride (75% aqueous solution) and 16.5 g of acrylamide in 312.4 g of ion exchange water as an aqueous solution of monomer (whole monomer concentration 20%) was used to yield 87.6 g of a beady cationic polymer of 150 to 350 μm in diameter. This polymer had a limiting viscosity of 4.0, and the molecular weight was low. Its degree of cationization was 3.2, indicating a high degree of hydrolysis.

Comparative Example 3 (using sorbitan monooleate surfactant)

The polymerization was carried out in the same manner as in Example 1 except that 1.48 g of sorbitan monooleate which is sorbitan fatty acid ester as a surfactant was used to yield 88.2 g of a fine particulate cationic polymer of 20 to 80 μm in diameter. There was no adhesion to the flask. This polymer had a limiting viscosity of 8.2 and a degree of cationization of 4.0. It was noted that this polymer was very difficult to dissolve in water because formation of powder lump was likely to occur due to fine particles.

Comparative Example 4 (using ethyl cellulose as a surfactant)

The polymerization was carried out in the same manner as in Example 1 except that cyclohexane as a dispersion medium and 5.02 g of ethyl cellulose (commercial name: Ethyl Cellulose N-200, produced by Hercules) as a surfactant was used to yield 70.4 g of a beady cationic polymer of 100 to 350 μm in diameter. This polymer had a limiting viscosity of 7.9 and a degree of cationization of 4.0. The amount adhered to the flask was 18.2 g. When dissolving this polymer into water, the solution was whitely turbid with a lot of insoluble substances.

The results are summarized in Table 1.

TABLE 1

| Example No. | Monomer Composition (mol %) | Surfactant | Particle Size (diameter) (μm) | Degree of Cationization (meq/g) | Limiting Viscosity [η] |
|---|---|---|---|---|---|
| Example 1 | AEAC/AAm = 60/40 | Sucrose ester 1 | 150~350 | 4.0 | 8.4 |
| Example 2 | AEAC/AAm = 80/20 | Sucrose ester 1 | 150~350 | 4.4 | 8.0 |
| Example 3 | AEAC/AAm = 90/10 | Sucrose ester 1 | 150~350 | 4.8 | 12.2 |
| Example 4 | AEAC = 100 | Sucrose ester 1 | 150~350 | 4.8 | 8.8 |
| Example 5 | AEAC = 100 | Sucrose ester 1 | 150~350 | 4.9 | 12.6 |
| Example 6 | AEAC = 100 | Sucrose ester 1 | 150~350 | 5.0 | 7.0 |
| Example 7 | AEAC/AAm = 60/40 | Sucrose ester 2 | 150~350 | 4.0 | 7.8 |
| Example 8 | AEAC/AAm = 60/40 | Sucrose ester 3 | 150~350 | 4.0 | 8.1 |
| Example 9 | AEAC/AAm = 60/40 | Polyglycerol 1 | 200~600 | 3.9 | 8.0 |
| Example 10 | AEAC/AAm = 60/40 | Polyglycerol 2 | 200~600 | 4.0 | 7.9 |
| Example 11 | AEAC = 100 | Polyglycerol 3 | 150~350 | 5.0 | 11.8 |
| Example 12 | AEAC/AAm = 60/40 | Sucrose ester 1 | 150~350 | 4.0 | 8.2 |
| Comparative Example 1 | AEAC = 100 | — | — | 3.9 | 3.0 |
| Comparative Example 2 | AEAC/AAm = 60/40 | Sucrose ester 1 | 150~350 | 3.2 | 4.0 |
| Comparative Example 3 | AEAC/AAm = 60/40 | Sorbitan ester | 20~80 | 4.0 | 8.2 |
| Comparative Example 4 | AEAC/AAm = 60/40 | Ethyl cellulose | 100~350 | 4.0 | 7.9 |

Sucrose ester 1: sucrose di-tristearate
Sucrose ester 2: sucrose distearate
Sucrose ester 3: sucrose mono-distearate
Polyglycerol 1: decaglyceryl pentastearate
Polyglycerol 2: diglyceryl monobehenylate
Polyglycerol 3: hexaglyceryl monobehenylate
Sorbitan ester: sorbitan monooleate
Ethyl cellulose: ethyl cellulose N-200(produced by Hercules)
AEAC: 2-acryloyloxyethyltrimethylammonium chloride
AAm: acrylamide

What is claimed is:

1. A method for the production of a water-soluble cationic polymer comprising polymerizing a water-soluble monomer selected from the group consisting of a cationic acrylate monomer represented by the Formula (1) alone, wherein $R^1$ and $R^2$ represent an alkyl group having 1 to 4 carbon atoms, $R^3$ represents a hydrogen atom or alkyl group having 1 to 4 carbon atoms, and $X^-$ represents a halide ion, sulfate ion, nitrate ion, phosphate ion, carboxylate ion or sulfonate ion,

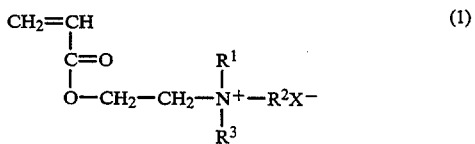

and a mixture of said monomer and another monomer copolymerizable therewith, wherein the concentration of the aqueous solution of said water-soluble monomer is 25 to 80% by weight, in a dispersion medium in the presence of a surfactant by suspension polymerization, wherein said surfactant is a sucrose fatty acid ester whose HLB is 2 to 12 or a polyglycerol fatty acid ester whose HLB is 2 to 16 or a mixture thereof, so as to give said water-soluble cationic polymer having a limiting viscosity of 5 to 15 (η) and a degree of cationization of 3.0 to 5.2.

2. The method according to claim 1 wherein the ratio of the cationic acrylate monomer accounts for 60 to 100 mol % in the mixture of the cationic acrylate monomer and another monomer copolymerizable therewith.

3. The method according to claim 1 wherein said cationic acrylate monomer is 2-acryloyloxyethyltrimethylammonium chloride.

4. The method according to claim 1 wherein said another monomer copolymerizable with the cationic acrylate monomer is acrylamide.

5. The method according to claim 1 wherein said sucrose fatty acid ester is sucrose di-tristearate.

6. The method according to claim 1 wherein said polyglycerol fatty acid ester is decaglyceryl pentastearate.

7. The method according to claim 1 wherein said dispersion medium is selected from the group consisting of normal hexane, normal heptane and cyclohexane.

8. The method according to claim 1 wherein the amount of said surfactant used is 0.05 to 5% by weight of the monomer.

* * * * *